(12) United States Patent
Takahashi

(10) Patent No.: US 11,407,239 B2
(45) Date of Patent: *Aug. 9, 2022

(54) PRINTING APPARATUS

(71) Applicant: SCREEN HOLDINGS CO., LTD., Kyoto (JP)

(72) Inventor: Susumu Takahashi, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/269,849

(22) PCT Filed: Sep. 9, 2019

(86) PCT No.: PCT/JP2019/035323
§ 371 (c)(1),
(2) Date: Feb. 19, 2021

(87) PCT Pub. No.: WO2020/059552
PCT Pub. Date: Mar. 26, 2020

(65) Prior Publication Data
US 2021/0221152 A1 Jul. 22, 2021

(30) Foreign Application Priority Data
Sep. 21, 2018 (JP) .............................. JP2018-178014

(51) Int. Cl.
*B41J 11/46* (2006.01)
*B41J 3/60* (2006.01)
(Continued)

(52) U.S. Cl.
CPC ................ *B41J 11/46* (2013.01); *B41J 3/60* (2013.01); *B41J 25/20* (2013.01); *G06K 15/1807* (2013.01)

(58) Field of Classification Search
CPC ... B41J 3/60; B41J 11/008; B41J 11/46; B41J 13/03; B41J 11/0095; B41J 13/0027;
(Continued)

(56) References Cited

U.S. PATENT DOCUMENTS 8,944,706 B2   2/2015 Sakamoto et al.
11,110,724 B2 *  9/2021 Takahashi ................ B41J 13/03
(Continued)

FOREIGN PATENT DOCUMENTS

EP     2 399 750 A1   12/2011
JP     2011-121237 A   6/2011
(Continued)

OTHER PUBLICATIONS

International Search Report issued in corresponding International Patent Application No. PCT/JP2019/035323, dated Oct. 8, 2019, with English translation.
(Continued)

*Primary Examiner* — David H Banh
(74) *Attorney, Agent, or Firm* — McDermott Will & Emery LLP

(57) ABSTRACT

After printing cue marks and front surface images on the front surface of web paper by a printing station, an image data elongation-contraction processor creates corrected back surface image data based on elasticity information, and a printing station prints back surface images based on the corrected back surface image data, on the back surface of the printing medium. At this time, a page interval calculator calculates a page interval from an interval between the cue marks detected by a detector, and a difference computing unit calculates differences between the page interval and image size in a transport direction of the corrected back surface image data. Since these differences indicate shifts of the correction based on the elasticity information, optimal (Continued)

elasticity information can be set by revising the elasticity information with these differences through a setting unit. Consequently, the operator of the apparatus can easily set optimal elasticity information based on the differences.

6 Claims, 5 Drawing Sheets

(51) Int. Cl.
*B41J 25/20* (2006.01)
*G06K 15/02* (2006.01)

(58) Field of Classification Search
CPC ....... B41J 29/38; B41J 25/20; G06K 15/1807; G06F 3/1208
See application file for complete search history.

(56) References Cited

U.S. PATENT DOCUMENTS

| | | | |
|---|---|---|---|
| 2004/0160409 A1* | 8/2004 | Kojima | G06F 3/147 345/107 |
| 2009/0016785 A1 | 1/2009 | Haan et al. | |
| 2011/0134178 A1 | 6/2011 | Chiwata | |
| 2011/0316925 A1 | 12/2011 | Saita | |
| 2012/0020689 A1 | 1/2012 | Inoue et al. | |
| 2014/0002531 A1* | 1/2014 | Mo | B41J 3/60 347/16 |
| 2016/0279978 A1* | 9/2016 | Stephens | B41J 3/60 |

FOREIGN PATENT DOCUMENTS

| | | |
|---|---|---|
| JP | 2011-164619 A | 8/2011 |
| JP | 2012-006349 A | 1/2012 |
| JP | 2012-048207 A | 3/2012 |
| JP | 2012-240786 A | 12/2012 |
| JP | 2014-144608 A | 8/2014 |
| JP | 2018-002314 A | 1/2018 |

OTHER PUBLICATIONS

Japanese Notice of Reasons for Refusal issued in corresponding Japanese Patent Application No. 2018-178014, dated Mar. 8, 2022, with English translation.

Extended European Search Report issued in related U.S. Appl. No. 16/525,025, for European Patent Application No. 19188865.0-4017, dated Feb. 10, 2020.

* cited by examiner

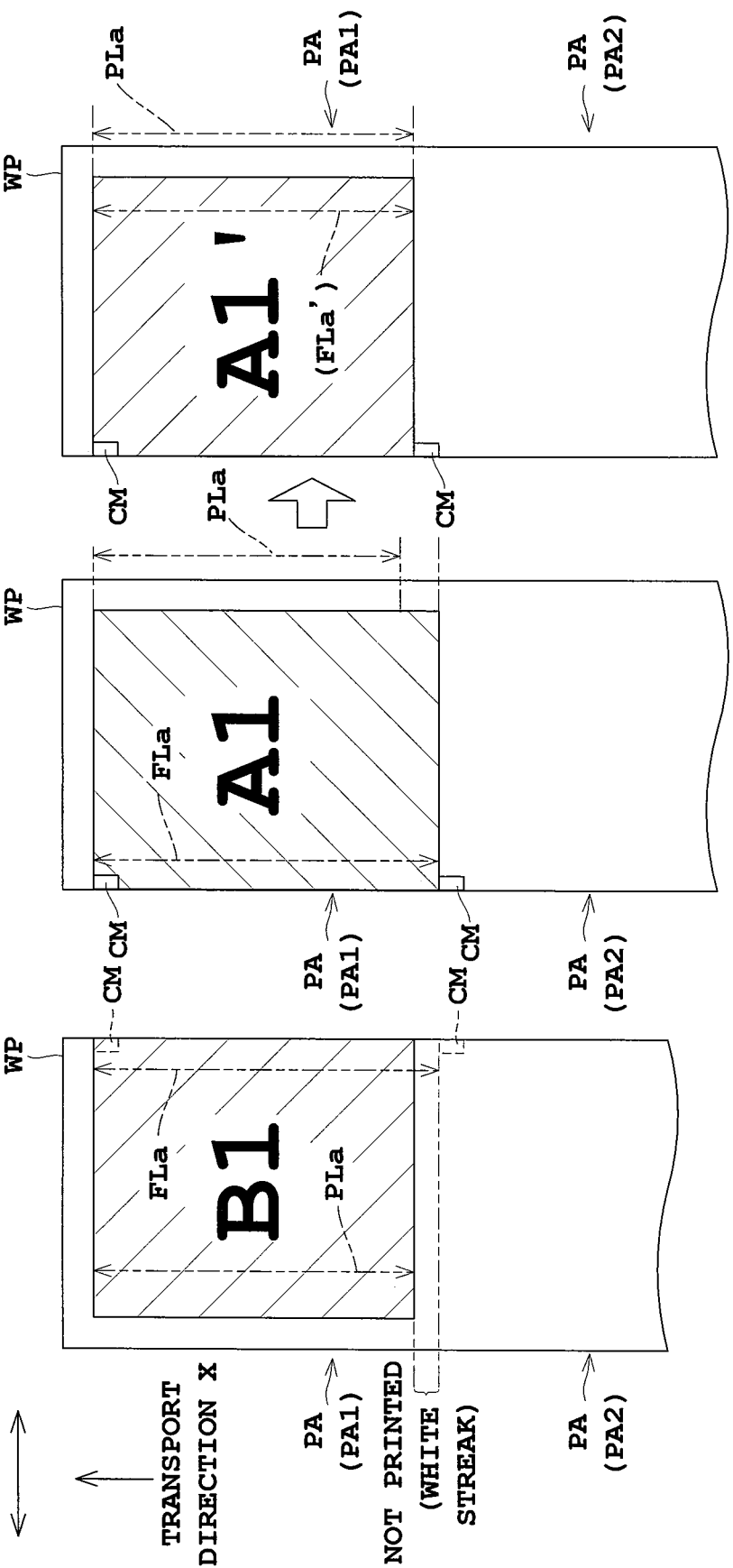

PRINTING APPARATUS

CROSS REFERENCE

This application is the U.S. National Phase under 35 U.S.C. § 371 of International Application No. PCT/JP2019/035323, filed on Sep. 9, 2019, which claims the benefit of Japanese Application No. 2018-178014, filed on Sep. 21, 2018, the entire contents of each are hereby incorporated by reference.

TECHNICAL FIELD

This invention relates to a printing apparatus for printing on the front surface of a printing medium, and thereafter printing on the back surface thereof, and more particularly to a technique of registering images on the front and back surfaces.

BACKGROUND ART

Conventionally, a known apparatus of this type includes a paper information acquiring unit, a front surface printing condition information acquiring unit, a register information creating unit, and a back surface printing unit (see Patent Document 1, for example) The paper information acquiring unit acquires paper information as information on printing paper. The front surface printing condition information acquiring unit acquires front surface printing condition information. The register information creating unit, based on the paper information and front surface printing condition information, acquires elasticity information in a width direction of the printing paper after images are printed on the front surface thereof, and creates register information in the width direction of the printing paper after images are printed on the front surface thereof. The back surface printing unit carries out a register correction using the register information at the time of back surface printing.

The above apparatus performs printing, taking into account an elongation or contraction in the width direction of the printing paper after the front surface printing and drying. Thus, any position shifting in the width direction between the prints on the front and back surfaces can be inhibited.

PRIOR ART DOCUMENT

Patent Document

[Patent Document 1]
Unexamined Patent Publication No. 2014-144608

SUMMARY OF INVENTION

Technical Problem

However, the conventional example with such construction has the following problem.

That is, the conventional apparatus, due to tension applied in the transport direction when printing on long printing paper, cannot cope with an elongation or contraction which is likely to occur in the transport direction of the printing paper. Moreover, the operator of the apparatus is required to carry out a test printing beforehand to measure visually a misregister between images on the front and back surfaces, adjust the elasticity information based on the result of the measurement, and carry out printing and measurement again through further printing with the adjusted elasticity information. This poses a problem of requiring a troublesome process of trial and error to set elasticity information for realizing an optimal and proper duplex printing free of misregister between images on the front and back surfaces.

In the above visual measurement, the operator needs to observe register marks (also called TONBO) and determine a shifting of 50 μm or 0.1 mm of the register marks, for example. It is thus extremely difficult to measure such shifting accurately. Further, it is not easy to obtain optimal elasticity information since the misregister between the front and back images varies also with printing conditions such as printing rate in the front and back image data, tension, and drying temperature.

This invention has been made having regard to the state of the art noted above, and its object is to provide a printing apparatus that enables optimal elasticity information to be set easily.

Solution to Problem

To fulfill the above object, this invention provides the following construction.

That is, the invention defined in claim 1 provides a printing apparatus for printing on a front surface of a printing medium, and thereafter printing on a back surface of the printing medium, the apparatus comprising a front surface print head for printing, on the front surface of the printing medium transported in a predetermined transport direction, cue marks indicating printing start positions in the transport direction of front surface images, and printing the front surface images based on front surface image data with reference to the cue marks; an elasticity information memory for storing elasticity information which is a degree of elasticity of the printing medium in the transport direction after printing of the front surface images; a back surface image data corrector for creating corrected back surface image data, based on the elasticity information, by correcting image sizes of back surface image data to be formed on the back surface of the printing medium; a detector for detecting the cue marks printed on the front surface of the printing medium; a back surface print head for printing on the back surface of the printing medium, back surface images based on the corrected back surface image data, with reference to the cue marks detected by the detector; a page interval calculator for calculating a page interval in the transport direction between the cue marks detected by the detector, before printing the back surface images based on the corrected back surface image data by the back surface print head; a difference computing unit for calculating differences between the page interval and the image size in the transport direction of the corrected back surface image data, when the corrected back surface image data is printed; and a setting unit for revising the elasticity information stored in the elasticity information memory based on the differences calculated by the difference computing unit.

[Functions and effects] According to the invention defined in claim 1, after printing cue marks and front surface images on the front surface of the printing medium by the front surface print head, the back surface image data corrector creates corrected back surface image data based on the elasticity information, and the back surface print head prints back surface images based on the corrected back surface image data on the back surface of the printing medium. At this time, the page interval calculator calculates a page interval from an interval between the cue marks detected by the detector, and the difference computing unit calculates differences between the page interval and image size in the transport direction of the corrected back surface image data. Since these differences indicate shifts of the correction based on the elasticity information, optimal elasticity information can be set by revising the elasticity information with these differences through the setting unit. Consequently, the operator of the apparatus can easily set optimal elasticity information based on the differences.

In this invention, it is preferred to comprise a difference memory for successively storing the differences calculated by the difference computing unit; and a statistical data calculator for calculating statistical data including a maximum value, a minimum value, an average value, and a standard deviate based on each difference in the difference memory; wherein the elasticity information is revised through the setting unit based on the statistical data (claim 2).

The statistical data calculator calculates statistical data based on the differences successively stored in the difference memory. Consequently, even if the differences are variable with the printing media, printing conditions and environmental conditions, the elasticity information can be revised to be optimal relatively easily with the statistical data.

In this invention, it is preferred to further comprise a display unit for displaying the differences calculated by the difference computing unit (claim 3).

With the differences displayed on the display unit, the operator of the apparatus can recognize the shifts without visual discrimination of the shifts.

In this invention, it is preferred that the display unit displays a distribution of the differences in the difference memory, and also displays statistical data used in the statistical data calculation (claim 4).

With the distribution of the differences and the statistical data displayed on the display unit, the operator of the apparatus can easily acquire information for optimizing the elasticity information.

In this invention, it is preferred to further comprise a drying unit disposed downstream of the front surface print head and upstream of the back surface print head, for drying the front surface images printed on the printing medium; wherein the detector is disposed downstream of the drying unit and upstream of the back surface print head (claim 5).

Since the cue marks are detected after printed by the front surface print head and dried by the drying unit, the page interval calculator can calculate the page intervals accurately. This allows the difference computing unit to calculate the differences accurately.

Further, the invention defined in claim 6 provides a printing apparatus for printing on a front surface of a printing medium, and thereafter printing on a back surface of the printing medium, the apparatus comprising a front surface print head for printing, on the front surface of the printing medium transported in a predetermined transport direction, cue marks indicating printing start positions in the transport direction of front surface images, and printing the front surface images based on front surface image data with reference to the cue marks; a detector for detecting the cue marks printed on the front surface of the printing medium; a back surface print head for printing, on the back surface of the printing medium, back surface images based on the back surface image data, with reference to the cue marks detected by the detector; a page interval calculator for calculating a page interval in the transport direction between the cue marks detected by the detector; a difference computing unit for calculating differences between the page interval and the image size in the transport direction of the corrected back surface image data, when the back surface image data is printed; a setting unit for setting elasticity information of the front surface image data in the transport direction based on the differences calculated by the difference computing unit; and a front surface image data corrector for correcting image sizes of the front surface image data based on the elasticity information set by the setting unit, to create corrected front surface image data for feeding to the front surface print head.

[Functions and effects] According to the invention defined in claim 6, after printing cue marks and front surface images on the front surface of the printing medium by the front surface print head, the back surface print head prints back surface images based on the back surface image data on the back surface of the printing medium, with reference to the cue marks detected by the detector. At this time, the page interval calculator calculates the page intervals from the intervals between the cue marks detected by the detector, and the difference computing unit calculates differences between the page interval and image size in the transport direction of back surface image data. Since these differences indicate shifts between the front and back images, an optimal amount of elongation or contraction can be set by setting through the setting unit an amount of elongation or contraction of the front surface image data using the differences. Consequently, the operator of the apparatus can set an optimal amount of elongation or contraction easily based on the differences.

Advantageous Effects of Invention

According to the printing apparatus of this invention, after printing cue marks and front surface images on the front surface of the printing medium by the front surface print head, the back surface image data corrector creates corrected back surface image data based on the elasticity information, and the back surface print head prints back surface images based on the corrected back surface image data on the back surface of the printing medium. At this time, the page interval calculator calculates a page interval from an interval between the cue marks detected by the detector, and the difference computing unit calculates differences between the page interval and image size in the transport direction of the corrected back surface image data. Since these differences indicate shifts of the correction based on the elasticity information, optimal elasticity information can be set by revising the elasticity information with these differences through the setting unit. Consequently, the operator of the apparatus can easily set optimal elasticity information based on the differences.

BRIEF DESCRIPTION OF THE DRAWINGS

FIG. 6 is a schematic view showing a procedure carried out, when a back surface image is not printed appropriately, to bring into agreement the sizes of the front and back surface images printed on web paper by correcting front surface image data.

DESCRIPTION OF EMBODIMENTS

Embodiments of this invention will be described hereinafter with reference to the drawings.

Figure 1:
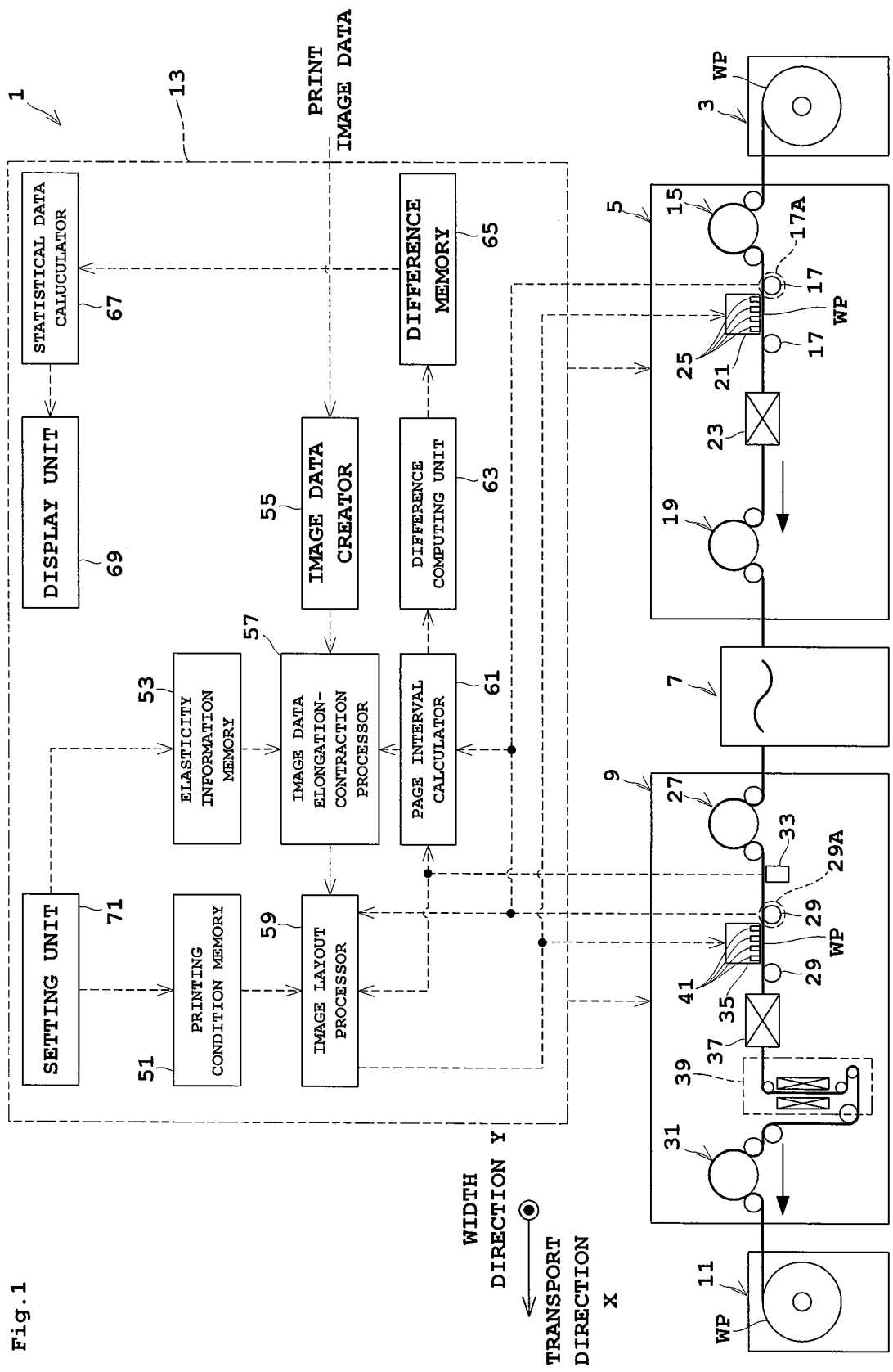
FIG. 1 is an overall view showing an outline construction of an inkjet printing apparatus according to an embodiment.

FIG. 1 is an overall view showing an outline construction of an inkjet printing apparatus according to an embodiment.

An inkjet printing apparatus 1 according to this embodiment includes a paper feeder 3, a front surface printing unit 5, an inverting unit 7, a back surface printing unit 9, a takeup roller 11, and a printing control unit 13.

The paper feeder 3 holds a roll of web paper WP to be rotatable about a horizontal axis. The paper feeder 3 unwinds the web paper WP to feed it in a transport direction X to the front surface printing unit 5. The takeup roller 11 winds up into a roll form around a horizontal axis the web paper WP printed on the two surfaces thereof by the front surface printing unit 5 and back surface printing unit 9.

The web paper WP noted above corresponds to the "printing medium" in this invention.

The front surface printing unit 5 has a drive roller 15 located adjacent the paper feeder 3 for taking in the web paper WP from the paper feeder 3. The web paper WP unwound from the paper feeder 3 by the drive roller 15 is transported downstream along a plurality of transport rollers 17. The front surface printing unit 5 has a drive roller 19 in the most downstream position thereof. Between the drive roller 15 and drive roller 19, a printing station 21 and a drying unit 23 are arranged in order from upstream.

The printing station 21 has a print head 25. The print head 25 prints front surface images on the web paper WP by dispensing ink droplets on the front surface of web paper WP. The print head 25 performs flushing for eliminating non-dispensation of the print head 25, printing of testing charts, printing of images as products, printing of test images which are not products, printing of cue marks indicating print starting positions, and so on. The drying unit 23 carries out a drying process on the web paper WP printed at the printing station 21. The transport roller 17 located upstream of the print head 21 has an encoder 17A for detecting a rotational frequency of the transport roller 17. The encoder 17A outputs a pulse signal corresponding to a transported distance of the web paper WP.

The above printing station 21 corresponds to the "front surface print head" in this invention.

The inverting unit 7 includes a plurality of rollers not shown, and turns upside down the web paper WP fed from the drive roller 19 of the front surface printing unit 5. The inverting unit 7 feeds the inverted web paper WP to the back surface printing unit 9.

The back surface printing unit 9 has a drive roller 27 located adjacent the inverting unit 7 for taking in the web paper WP from the inverting unit 7. The web paper WP taken in by the drive roller 27 is transported downstream along a plurality of transport rollers 29. The back surface printing unit 9 has a drive roller 31 in the most downstream position thereof. Between the drive roller 27 and drive roller 31, a detector 33, a printing station 35, a drying unit 37, and a bifacial inspecting device 39 are arranged in order from upstream.

The detector 33 detects the cue marks indicating the printing start positions in the transport direction X of the front surface images printed by the print head 25 of the front surface printing unit 5. The printing station 35 has a print head 41. The print head 41 prints back surface images on the web paper WP by dispensing ink droplets on the back surface of web paper WP. The print head 41 performs flushing for eliminating non-dispensation of the print head 41, printing of testing charts, printing of images as products, printing of test images which are not products, and so on. The drying unit 37 carries out a drying process on the web paper WP printed at the printing station 35. The bifacial inspecting device 39 inspects the front surface images and back surface images printed at the printing stations 21 and 35. The transport roller 29 located upstream of the print head 41 has an encoder 29A for detecting a rotational frequency of the transport roller 29. The encoder 29A outputs a pulse signal corresponding to a distance the web paper WP is transported.

The above printing station 35 corresponds to the "back surface print head" in this invention.

The printing station 25 of the front surface printing unit 5 and the printing station 35 of the back surface printing unit 9 described above are capable, for example, of color printing using black (K), cyan (C), magenta (M), and yellow (Y), and special color printing with special color (e.g. gold) other than the above colors. Each of the print heads 25 and 41 has a plurality of nozzles arranged in a width direction Y of the web paper WP (depth direction from the plane of FIG. 1).

The above front surface printing unit 5 and back surface printing unit 9 are operable under overall control of the printing control unit 13. This printing control unit 13 includes a printing condition memory 51, an elasticity information memory 53, an image data creator 55, an image data elongation-contraction processor 57, an image layout processor 59, a page interval calculator 61, a difference computing unit 63, a difference memory 65, a statistical data calculator 67, a display unit 69, and a setting unit 71

The printing condition memory 51 has stored beforehand printing conditions such as specifications, e.g. a print area length and a width of the web paper WP, transporting speed, tension, and so on. The printing conditions are set beforehand by the operator of the apparatus through the setting unit 71 in the form of a keyboard, for example. The elasticity information memory 53 has stored beforehand elasticity information on elongation and contraction in the transport direction X of the web paper WP printed by the front surface printing unit 5. The elasticity information is set in numerical values such as 1/100%, for example. This elasticity information is acquired by carrying out test printing not used for products, before printing products, and measuring degrees of influence on back surface printing caused by elongation and contraction occurring with front surface printing. Such degrees are set in the physical constants noted above.

The image data creator 55, for example, receives print image data including front surface image data and back surface image data from an external host computer, and creates front surface image data and back surface image data for processing by the front surface printing unit 5 and back surface printing unit 9. The image data elongation-contraction processor 57 performs an elongation-contraction process on the back surface image data based on the elasticity information in the elasticity information memory 53. On the other hand, the image data elongation-contraction processor 57 performs no process on the front surface image data. The elongation-contraction process on the back surface image data consists in multiplying the back surface image data in the transport direction X by a constant based on the elasticity information, thereby to create corrected back surface image data.

The above image data elongation-contraction processor 57 corresponds to the "back surface image data corrector" in this invention.

The image layout processor 59 operates the printing station 21 based on the printing conditions from the printing condition memory 51, the front surface image data from the image data elongation-contraction processor 57, and the signal from the encoder 17A, to print the cue marks, and the front surface images corresponding to the front surface image data with reference to the cue marks on the front surface of the web paper WP. Further, the image layout processor 59 operates the printing station 35 based on the printing conditions from the printing condition memory 51, the corrected back surface image data from the image data elongation-contraction processor 57, the signal from the encoder 29A, and the signal from the detector 33, to print on the back surface of the web paper WP the back surface images corresponding to the corrected back surface image data with reference to the cue marks on the front surface.

Figure 2:
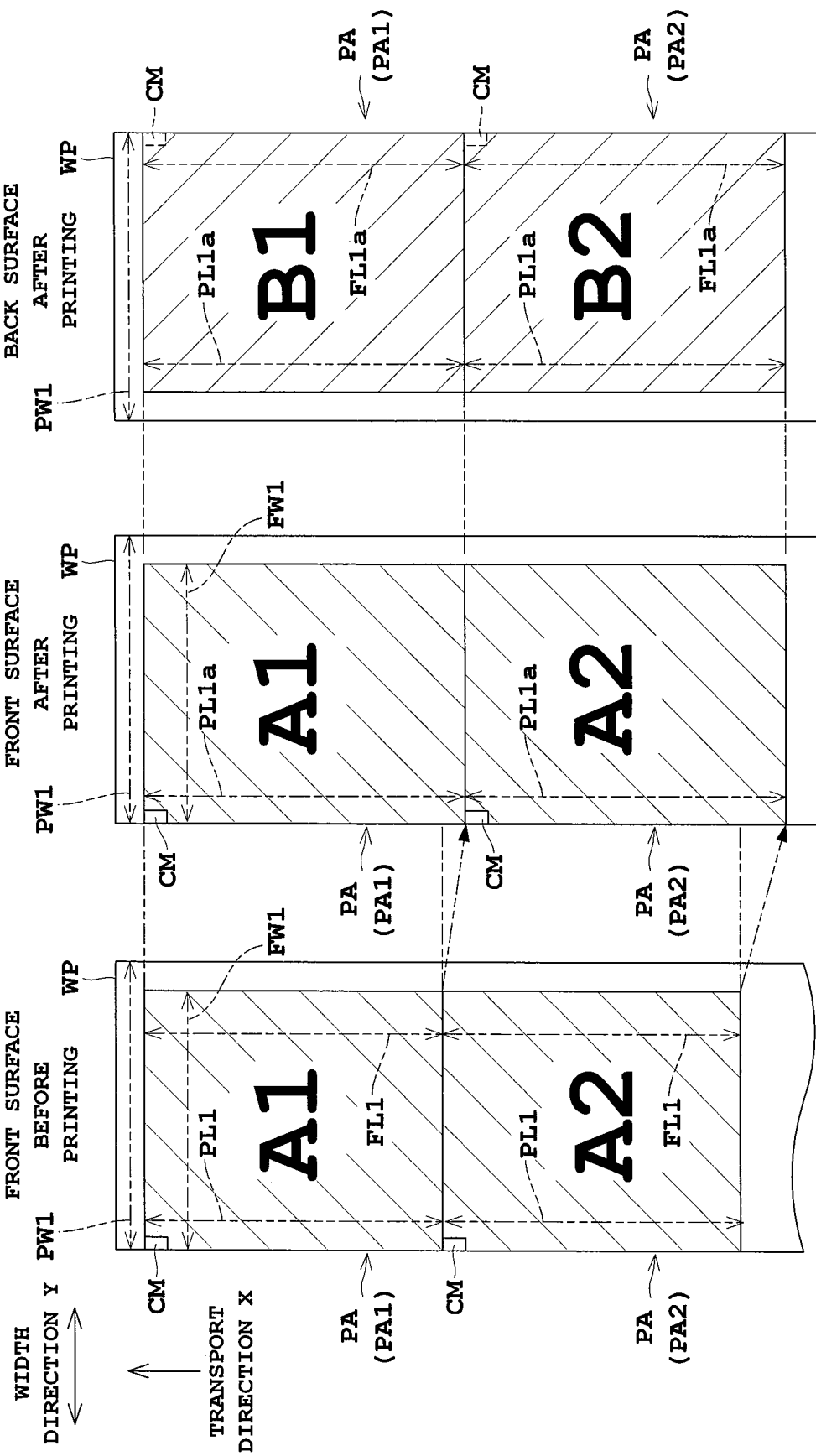
FIG. 2 is a schematic view showing an image printing process, in which (a) is a front surface before printing, (b) is a front surface after printing, and (c) is a back surface after printing.

Next, a printing process accompanied by the above correction will be described in detail with reference to FIG. 2. FIG. 2 is a schematic view showing an image printing process, in which (a) is a front surface before printing, (b) is a front surface after printing, and (c) is a back surface after printing. It is assumed here that the web paper WP is elongated by front surface printing, and that elasticity information corresponding to the degree of elongation is stored in the elasticity information memory 53. The term "after printing" used here refers to after being printed at the printing station 21 and dried at the drying unit 23.

The front surface printing unit 5 operates under control of the printing control unit 13 to print, of print pages PA on the front surface of the web paper WP, a cue mark CM and a front surface image A1 based on the front surface image data on a first page PA1, and a cue mark CM and a second front surface image A2 based on the front surface image data on a second page PA2. In this embodiment, various measurements on the front surface before printing are assumed as shown in FIG. 2 (*a*), which include a paper width PW1 in the width direction Y of the web paper WP, a print area length PL1 in the transport direction X of each print page PA of the web paper WP, a front surface image data length FL1 in the transport direction X of each print page PA, and a front surface image data width FW1 in the width direction Y of each print page PA. In this case, the image layout processor 59 carries out a layout process on the front surface images A1 and A2 so that the front surface image data length FL1 be equal to the print area length PL1.

When the front surface images A1 and A2 are printed, as shown in FIG. 2 (*a*), each of the measurements after the printing will be as shown in FIG. 2 (*b*), for example. That is, the print area length PL1 in which each of the front surface images A1 and A2 is printed increases to a print area length PL1*a*. Since the front surface images A1 and A2 printed elongate with the web paper WP, the length of the front surface images A1 and A2 becomes equal to the print area length PL1*a*.

Next, the image layout processor 59 prints back surface images B1 and B2. The back surface image data of the back surface images B1 and B2 have been elongated by the elasticity information to become corrected back surface image data. Consequently, the back surface images B1 and B2, as shown in FIG. 2 (*c*), have a length in the transport direction X that is substantially equal to the print area length PL1*a* after the front surface image printing. At this time, the image layout processor 59, by reference to the signal outputted from the encoder 29A based on the time the detector 33 detects the cue marks CM, prints corrected back surface images B1 and B2 in areas having the print area length PL1*a* from the cue marks CM.

page interval calculator 61 calculates a length in the transport direction X between the cue mark CM and the next cue mark CM printed on the front surface of the web paper WP. That is, the page interval calculator 61 calculates an interval between the cue marks CM based on the signal from the encoder 29A representing a count from when the detector 33 detects the first cue mark CM until when the detector 33 detects the next cue mark CM. This interval becomes equal to the print area length PL1*a* after the front surface printing in FIG. 2 (*b*). That is, the page interval calculator 61 calculates a page interval after the front surface printing (=print area length PL1*a* after the front surface printing).

The difference computing unit 63 calculates a difference between a page interval that is the print area length PL1*a* (=the length of print pages PA) after the surface printing, and a length in the transport direction X included in the image size of the back surface image data created by the image data elongation-contraction processor 57. The difference computing unit 63 successively calculates, and successively stores in the difference memory 65, the page intervals of the respective print pages PA of the web paper WP transported.

Figure 3:
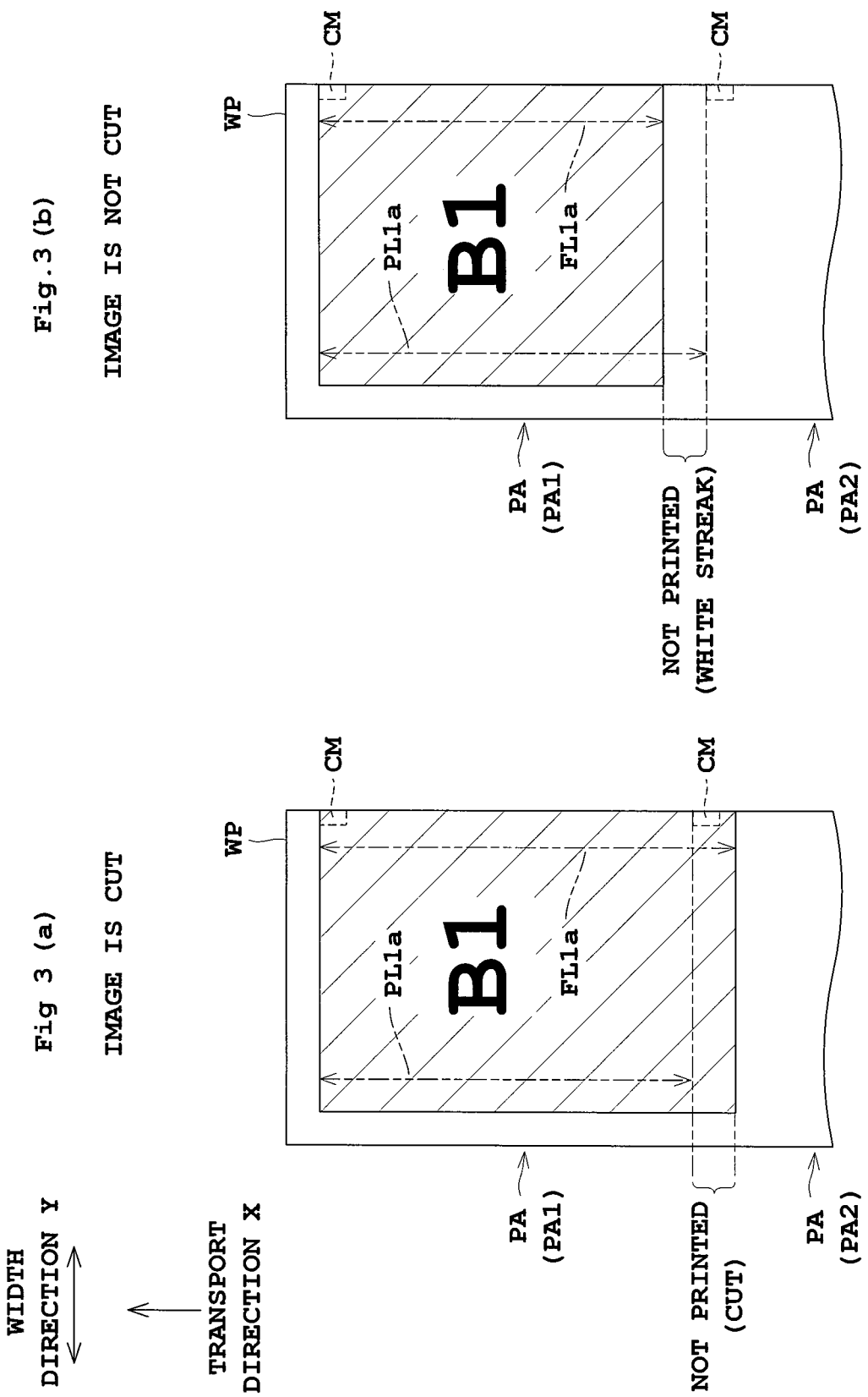
FIG. 3 is a schematic view showing states where back surface images are not printed appropriately, in which (a) shows a case where an excess has occurred to a back surface image, and (b) shows a case where a deficiency has occurred to a back surface image.

Reference is now made to FIG. 3. FIG. 3 is a schematic view showing states where back surface images are not printed appropriately, in which (a) shows a case where an excess has occurred to a back surface image, and (b) shows a case where a deficiency has occurred to a back surface image.

As described above, after the front surface images A1 and A2 are printed, corrected back surface images B1 and B2 are printed based on the corrected back surface image data, and differences are calculated successively. When the elasticity information used in the correction is inappropriate, the results may be printed as shown in FIGS. 3 (*a*) and (*b*).

That is, as shown in FIG. 3 (*a*), the length FL1*a* of the back surface image B1 based on the corrected back surface image data is larger than the page interval (=print area length PL1*a*) after printing of the front surface image A1. In this case, the back surface image B1 becomes excessive, and the portion including the cue mark CM and thereafter of the second page PA2, corresponding to the difference, is cut without being printed. It is assumed in this example that the sign of the difference in the case of the cue mark CM and thereafter being cut is positive. On the other hand, as shown in FIG. 3 (*b*), the length FL1*a* of the back surface image B1 based on the corrected back surface image data is less than the page interval (=print area length PL1*a*) after printing of the front surface image A1. In this case, the back surface image B1 becomes deficient, and leaves a white streak, corresponding to the difference, where nothing is printed between the downstream end of the back surface image B1 and the cue mark CM of the second page PA2. It is assumed in this example that the sign of the difference in the case of the back surface image B1 downstream of the cue mark CM being deficient is negative.

Figures 4, 5:
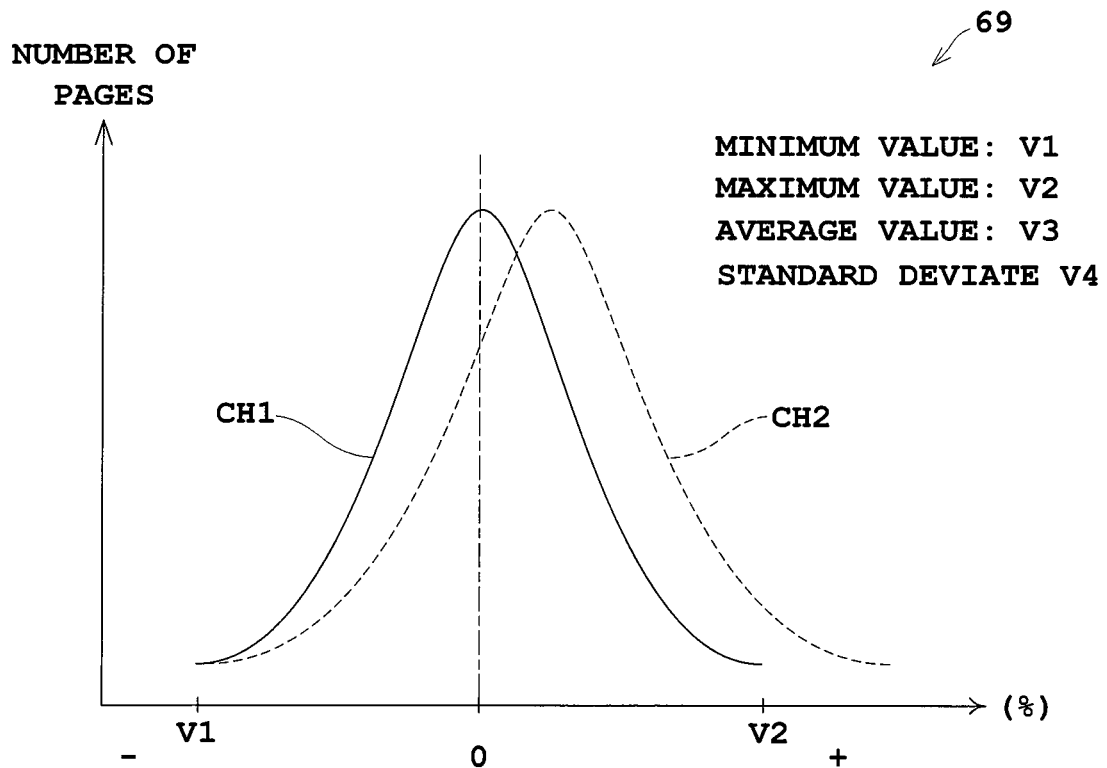
FIG. 4 is a schematic view of data stored in a difference memory.
FIG. 5 is a schematic view showing an example of display mode on a display unit.

The above differences are successively stored as shown in FIG. 4, for example. FIG. 4 is a schematic view of data stored in the difference memory.

The difference memory 65 successively stores Nos. indicating the order of storage, and the differences corresponding thereto, for example. The differences are numerical values including the above-noted signs, for example. The unit is mm, for example, but may be 1/100% as are numerical values in the elasticity information, or number of lines.

The statistical data calculator 67 statistically analyzes the differences stored in the difference memory 65, and successively calculates statistical data including maximum value, minimum value, average value, and standard deviate, for example. The display unit 69 displays a graph representing a frequency distribution of the differences in the difference memory 65, and the statistical data calculated by the statistical data calculator 67, for example. A specific display is as shown in FIG. 5, for example. FIG. 5 is a schematic view showing an example of display mode on the display unit 69.

As shown in FIG. 5, the display unit 69 displays a graph CH1 representing a distribution of the differences and the statistical data, for example. Since the differences are calculated successively, the distribution may vary whenever the print pages PA pass through the detector 33. For example, the distribution may change from graph CH1 to graph CH2 during printing. The minimum value V1, maximum value V2, average value V3, and standard deviate V4 of the statistical data also change therewith. The operator of the apparatus, by observing the display on the display unit 69, checks whether the current elasticity information is appropriate or not. When the current elasticity information is determined inappropriate, the setting unit 71 is operated to correct the elasticity information stored in the elasticity information memory 53, by using the differences, their statistical data, and graphs CH1 and CH2 as support materials. The image data elongation-contraction processor 57 revises the corrected back surface image data based on the corrected elasticity information, and sends it to the image layout processor 59. The image layout processor 59 performs printing of back surface images on succeeding web paper WP based on the corrected back surface image data revised by the image layout processor 59.

According to this embodiment, without visually measuring a shifting through trial and error by test printing, optimal elasticity information can be set even during product printing by referring to the information on the display unit 69. Consequently, the operator of the apparatus can easily set optimal elasticity information based on the differences.

The statistical data calculator 67 calculates statistical data based on the differences successively stored in the difference memory 65. Consequently, even if the differences are variable with the types of web paper WP, printing conditions and environmental conditions, optimal elasticity information can be acquired relatively easily from the statistical data.

The operator of the apparatus can easily acquire the information for optimizing the elasticity information from the difference distribution and the statistical data displayed on the display unit 69.

The detector 33 for detecting cue marks CM is located downstream of the drying unit 23 and upstream of the printing station 35 of the back surface printing unit 9, and detects cue marks CM after printed by the surface print head and dried by drying unit 23. Consequently, the page interval calculator 61 can accurately calculate page intervals elongated or contracted, which enables the difference computing unit 63 to calculate the differences accurately.

This invention is not limited to the foregoing embodiment, but may be modified as follows:

(1) The foregoing embodiment has been described taking the web paper WP as an example of printing media. This invention is not limited to such printing medium. For example, this invention is applicable to other printing media such as film.

(2) The foregoing embodiment includes the difference memory 63 and statistical data calculator 67, but these are not indispensable to this invention. That is, the differences calculated by the difference computing unit 63 may be used as they are, to set optimal elasticity information based thereon.

(3) In the foregoing embodiment, the statistical data and the graphs CH1 and CH2 are displayed in numerical values. These displays may be replaced with only graphic figures indicating signs and measures of the differences, for example. For example, a red graphic figure may express a negative sign, a blue graphic figure positive, and the sizes of the graphic figures the measures of the differences. Even with such displays, it can be determined what amount the elasticity information should be revised in the positive or negative direction.

(4) In the foregoing embodiment, the operator corrects the elasticity information through the setting unit 71 based on the differences. However, it may be corrected automatically. For example, the elasticity information may be corrected by reflecting in the elasticity information certain part of the statistical data calculated by the statistical data calculator 67.

(5) The foregoing embodiment has been described taking the inkjet printing apparatus 1 as an example. This invention is applicable also to printing apparatus with a possibility that the printing medium undergoes elongation or contraction.

(6) In the foregoing embodiment, the graph CH1 and statistical data are displayed on the display unit 69 during the printing, and the operator corrects the elasticity information with reference to these data during the printing. However, the graph CH1 and statistical data may be displayed on the display unit 69 upon finish of a series of printings. The operator may determine by referring to this data whether or not re-printing is needed.

(7) In the foregoing embodiment, with reference to the differences and other data displayed on the display unit 69, the operator operates the setting unit 71 to correct the elasticity information of the back surface image data. However, instead of elongating or contracting the back surface image data, the front surface image data may be elongated or contracted in the transport direction X to match the sizes of the front and back images on the web paper WP.

Description will now be made with reference to FIG. 6. As noted hereinbefore using FIG. 3 (*b*), FIG. 6 (*a*) is a schematic view showing a state where a back surface image is not printed appropriately, which is a case where a deficiency has occurred to the back surface image.

That is, the length FLa of a back surface image B1 based on the back surface image data is shorter than the page interval (=print area length PLa) after printing of the front surface image A1, and thus the back surface image B1 is deficient. This difference leaves a white streak where nothing is printed between the downstream end of the back surface image B1 and the cue mark CM of the second page PA2.

The difference computing unit 63 calculates a difference in the transport direction X between the page interval and the back surface image B1 printed on back surface page PA in the state of FIG. 6 (*a*). This difference is stored in the difference memory 65 and displayed on the display unit 69. The operator of the apparatus refers to the difference and other data displayed on the display unit 69, and determines an elasticity rate of the front surface image A1 required to match in size of the front surface image A1 to the back surface image B1. Further, the operator of the apparatus operates the setting unit 71 and inputs the elasticity rate of the front surface image A1. Consequently, the image data size of the front surface image data printed after this is corrected. FIG. 6 (b) shows in a state of the front surface of the web paper WP before inputting of the elasticity rate. The size in the transport direction X of the front surface image A1 is FLa. FIG. 6 (c) shows a front surface image A1' after the image data size is corrected. The size in the transport direction X of the surface image A1' has been reduced to FLa'. This eliminates the white streak between the downstream end of the back surface image B1 and the cue mark CM of the second page PA2.

INDUSTRIAL UTILITY

As described above, this invention is suitable for a printing apparatus for printing on the front surface of a printing medium, and thereafter printing on the back surface.

REFERENCE SIGNS LIST

1 . . . inkjet printing apparatus
3 . . . paper feeder
5 . . . front surface printing unit
7 . . . inverting unit
9 . . . back surface printing unit
11 . . . takeup roller
13 . . . printing control unit
WP . . . web paper
15, 19, 27, 31 . . . drive rollers
17, 29 . . . transport rollers
17A, 19A . . . encoders
21, 35 . . . printing stations
23, 37 . . . drying units
25, 41 . . . print heads
33 . . . detector
39 . . . bifacial inspecting device
51 . . . printing condition memory
55 . . . image data creator
57 . . . image data elongation-contraction processor
59 . . . image layout processor
61 . . . page interval calculator
63 . . . difference computing unit
65 . . . difference memory
67 . . . statistical data calculator
69 . . . display unit
71 . . . setting unit
PA . . . print pages
CM . . . cue marks
A1, A2 . . . front surface images
B1, B2 . . . back surface images
CH1, CH2 . . . graphs
V1 . . . minimum value
V2 . . . maximum value
V3 . . . average value
V4 . . . standard deviate

What is claimed is:

1. A printing apparatus for printing on a front surface of a printing medium, and thereafter printing on a back surface of the printing medium, the apparatus comprising:
a front surface print head for printing, on the front surface of the printing medium transported in a predetermined transport direction, cue marks indicating printing start positions in the transport direction of front surface images, and printing the front surface images based on front surface image data with reference to the cue marks;
an elasticity information memory for storing elasticity information which is a degree of elasticity of the printing medium in the transport direction after printing of the front surface images;
a back surface image data corrector for creating corrected back surface image data, based on the elasticity information, by correcting image sizes of back surface image data to be formed on the back surface of the printing medium;
a detector for detecting the cue marks printed on the front surface of the printing medium;
a back surface print head for printing on the back surface of the printing medium, back surface images based on the corrected back surface image data, with reference to the cue marks detected by the detector;
a page interval calculator for calculating a page interval in the transport direction between the cue marks detected by the detector, before printing the back surface images based on the corrected back surface image data by the back surface print head;
a difference computing unit for calculating differences between the page interval and the image size in the transport direction of the corrected back surface image data, when the corrected back surface image data is printed; and
a setting unit for revising the elasticity information stored in the elasticity information memory based on the differences calculated by the difference computing unit.

2. The printing apparatus according to claim 1, comprising:
a difference memory for successively storing the differences calculated by the difference computing unit; and
a statistical data calculator for calculating statistical data including a maximum value, a minimum value, an average value, and a standard deviate based on each difference in the difference memory;
wherein the elasticity information is revised through the setting unit based on the statistical data.

3. The printing apparatus according to claim 1, further comprising a display unit for displaying the differences calculated by the difference computing unit.

4. The printing apparatus according to claim 3, wherein the display unit displays a distribution of the differences in the difference memory, and also displays statistical data used in the statistical data calculation.

5. The printing apparatus according to claim 1, further comprising a drying unit disposed downstream of the front surface print head and upstream of the back surface print head, for drying the front surface images printed on the printing medium;
wherein the detector is disposed downstream of the drying unit and upstream of the back surface print head.

6. A printing apparatus for printing on a front surface of a printing medium, and thereafter printing on a back surface of the printing medium, the apparatus comprising:
a front surface print head for printing, on the front surface of the printing medium transported in a predetermined transport direction, cue marks indicating printing start positions in the transport direction of front surface images, and printing the front surface images based on front surface image data with reference to the cue marks;
a detector for detecting the cue marks printed on the front surface of the printing medium;
a back surface print head for printing, on the back surface of the printing medium, back surface images based on the back surface image data, with reference to the cue marks detected by the detector;

a page interval calculator for calculating a page interval in the transport direction between the cue marks detected by the detector;

a difference computing unit for calculating differences between the page interval and the image size in the transport direction of the corrected back surface image data, when the back surface image data is printed;

a setting unit for setting elasticity information of the front surface image data in the transport direction based on the differences calculated by the difference computing unit; and a front surface image data corrector for correcting image sizes of the front surface image data based on the elasticity information set by the setting unit, to create corrected front surface image data for feeding to the front surface print head.

\* \* \* \* \*